United States Patent [19]

Forberg et al.

[11] 4,452,502
[45] Jun. 5, 1984

[54] WIRE CONNECTOR FOR TELECOMMUNICATIONS CABLES

[75] Inventors: Horst Forberg; Manfred Müller, both of Berlin, Fed. Rep. of Germany

[73] Assignee: Krone GmbH, Berlin, Fed. Rep. of Germany

[21] Appl. No.: 360,593

[22] Filed: Mar. 22, 1982

[30] Foreign Application Priority Data

Apr. 4, 1981 [DE] Fed. Rep. of Germany ....... 3113757

[51] Int. Cl.³ ............................................ H01R 11/20
[52] U.S. Cl. ................................. 339/99 R; 339/97 P
[58] Field of Search ...................... 339/31 T, 95 R, 96, 339/97 R, 97 P, 98, 108 TP, 147 P, 149 P, 150 B, 151 B, 99 R

[56] References Cited

U.S. PATENT DOCUMENTS

| | | | |
|---|---|---|---|
| 3,708,779 | 1/1973 | Enright et al. | 339/99 R |
| 3,835,444 | 9/1974 | Plana et al. | 339/98 |
| 4,045,112 | 8/1977 | Rodondi et al. | 339/99 R |
| 4,171,857 | 10/1979 | Forberg et al. | 339/97 P |

FOREIGN PATENT DOCUMENTS

1212180  9/1966 Fed. Rep. of Germany.
2083294A 3/1982 United Kingdom ................ 339/222

*Primary Examiner*—Eugene F. Desmond
*Assistant Examiner*—Steven C. Bishop
*Attorney, Agent, or Firm*—Brown & Martin

[57] ABSTRACT

The present invention relates to a wire connector for the incoming and outgoing wires of a telecommunications cable, in which the connector body (3) comprises a cover portion (1) and a bottom portion (2). For the termination of two wires (4) there is fixedly mounted a solderless, non-screwed, strip-free terminal (5) having a polytropic air gap, a resilient tab (7) having a crimped portion (6) being integrally formed at one end of said terminal (5) and the contact arms (5a) of said terminal (5) being offset relative to the cable axis at an angle of about 45 degrees. The bottom portion (2) of the connector body (3) is provided with either tubular or channel-like guide means (8, 8a) and clamping ribs (9), a cutting blade (10) for separating the cable wires being also inserted. The cover portion (1) is formed with an aperture (11) for insertion of a test prod (12).

6 Claims, 4 Drawing Figures

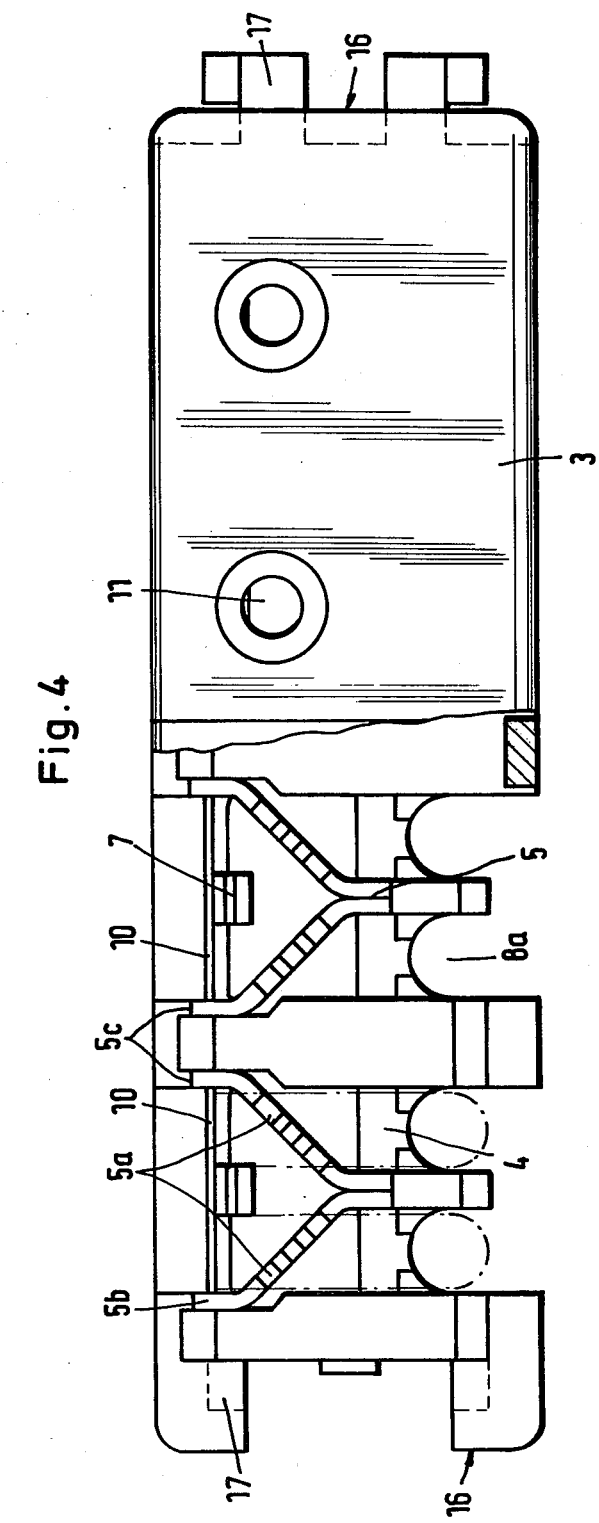

WIRE CONNECTOR FOR TELECOMMUNICATIONS CABLES

The present invention relates to a wire connector for connecting the incoming and outgoing wires of a telecommunications cable and is intended to provide a simple and inexpensive device of this type.

The LSA-PLUS-technique (LSA=löt-, schraub- und abisolier-frei=solderless, non-screwed and strip-less; PLUS=polytroper Luft-palt=polytropic air gap) developed by the applicant and employed in the present connector for the termination of insulated wires to contact terminals, in which the leaf-spring arms due to torsional forces cause automatic re-adjustment (e.g. in case of fatigue or mechanical stress of the contact portions) and thus provide for a permanent good contact, has been widely used in the concerned field.

This LSA-PLUS-technique is also employed in the present wire connector by interconnecting incoming and outgoing wires within a plastics body through a respective LSA-PLUS terminal.

A number of wire connectors for telecommunications cables have been known which may be classified according to the following aspects:

(1) Wire connecting sleeves which are suitable for interconnecting a respective outgoing and incoming cable wire.
(2) So-called Picabond connectors, in which, for instance, the incoming and outgoing wires are clamped into a metal member of U-shaped cross-section, which member is then crimped by means of a tool, thereby forming an electrical connection.
(3) Multipoint wire connectors which are provided for a multiplicity of wires and which interconnect e.g. 20 wires simultaneously.

One of the drawbacks of these known wire connectors is that e.g. in the connector mentioned in item (1) the wire must be cut to predetermined lengths.

In the case of cable splices of ≦200 twin wires, the wire connecting sleeves generally must be, and the Picabond connectors preferably should be, crimped individually for each wire termination.

In both specified types of wire connectors overplugging to a line for purposes of troubleshooting is accomplished by considerable difficulties.

Both types mentioned in items (1) and (2) can only be used once.

As regards item (3), a connector for a thin insulated electrical wire has been known from the German Patent Specification No. 1,212,180, in which a plurality of incoming wires are connected to outgoing wires by means of a connecting member.

The contact portions of the interconnected wires are only insufficiently protected against vibrational movement, which particularly with very thin wires may result in contact interruptions during vibrations.

The known multipoint connectors are not suitable for water-tight (grease-filled) cables.

It is therefore the object of the present invention to eliminate the drawbacks mentioned above and to provide a wire connector which at less expenditure of energy ensures reliable termination.

The subject matter of the present invention which solves the above object is the wire connector as characterised in patent claim 1.

Further advantageous features and embodiments of the invention are characterised in the subclaims.

The following advantages, which are essential to the invention, are achieved with the novel wire connector:

1. It is possible to simultaneously interconnect in one clamping step a plurality of pairs of wires, e.g. four incoming and four outgoing wires, in accordance with colour markings.
2. The cable wires to be terminated are bent downstream of a tubular or channel-like guide means at an angle of 90 degrees and are led to the terminal elements and after the clamping step, i.e., after depression of the cover portion, are additionally retained in clamping ribs integrally formed therewith.
3. Because of the provision of resilient tabs on the terminal elements it is possible to overplug any desired individual wire connection by application of a test prod.
4. Due to suitable latching means the bottom portion and the cover portion are latched in assembled state, so that the wire connector is also suitable for the wires of grease-filled cables.

An embodiment of the invention will be described in detail with reference to the accompanying drawing, in which:

FIG. 4 is a partially broken plan view of the channel-like guide means.

Figure 1:
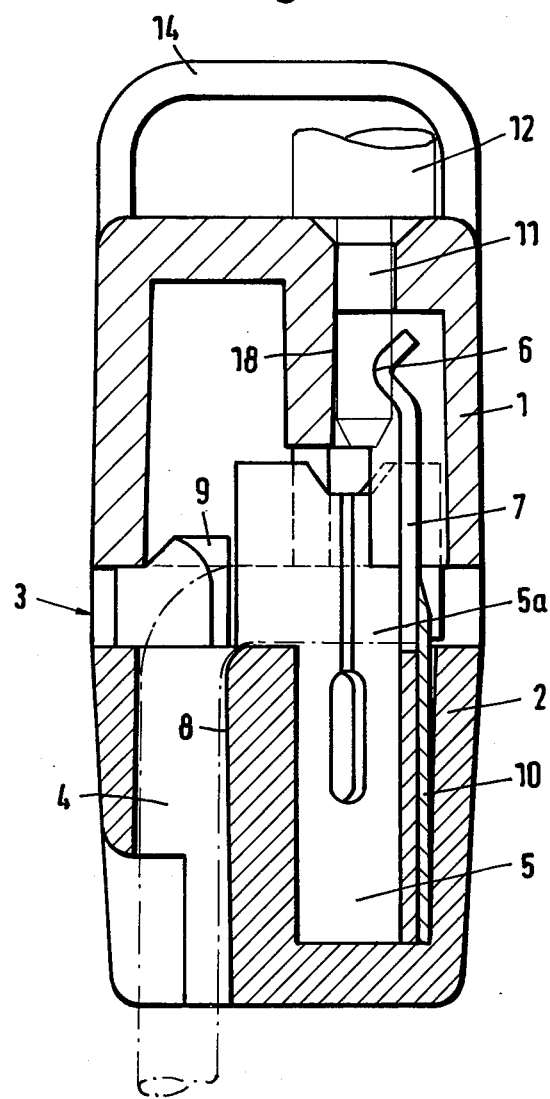
FIG. 1 is a sectional side view of the wire connector with a test prod indicated.

As shown in FIG. 1, the body 3 of the wire connector comprises a bottom or lower portion 2 and a top or cover portion 1.

These two portions are interconnected by means of an arcuate film hinge 14. The two portions are latched to one another by means of detents 15 (cf. FIG. 3) so that the wire connector is also suitable for connecting the wires of grease-filled cables.

As is further apparent from FIG. 1, the cable wire 4 comes in from below, and the wire to be connected is initially passed through a tubular or channel-like guide means 8 and is then bent by 90 degrees.

Figure 3:
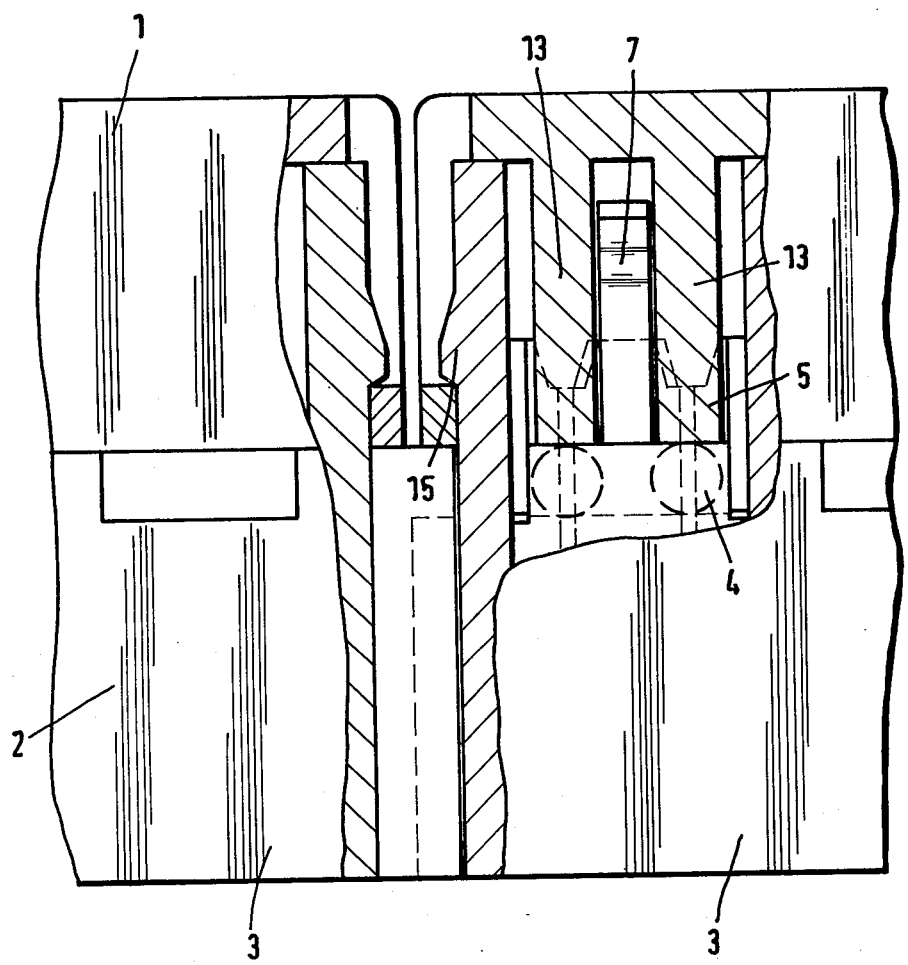
FIG. 3 is an illustration of the interengagement between the bottom portion and the top cover as well as a view of the wire and the terminal element in contact with each other (cf. the broken lines); here, two serially disposed wire connectors according to the invention are illustrated.

When the cover portion 1 is closed up, the cable wire 4 will be pressed into the contact slot of the terminal element 5 by means of the insertion lugs 13 shown in FIG. 3, whereby contact will be established between the wire core and the terminal element 5.

The cable wire 4 will be fixed in its position by means of clamping ribs 9.

As will be apparent from FIG. 1, the terminal element 5 itself is embedded in the bottom portion 2 of the wire connector. As is well known, the contact arms 5a are positioned at an angle of 45 degrees relative to the wire axis. A cutting blade 10 is disposed behind the terminal element 5 for separating the protruding wire end.

Each terminal element 5 is used for connecting one incoming and one outgoing cable wire. As will be apparent from FIG. 2, four terminal elements 5 are provided within each body 3.

The contact ends 5b of the contact arms 5a are of angular design and are stabilized within guide passages 5c. As will be apparent from the FIGS. 1 and 2, a test prod 12 may be introduced from above through the aperture 11 of the cover 1.

A respective aperture 11 is provided for each terminal element 5, so that overplugging to any wire termination may be performed by applying a test prod 12. For this purpose resilient tabs 7 each having a crimped portion 6 on one end are provided on the terminal elements 5.

The test prod 12 is resiliently clamped between the resilient tab 7 and the opposite locating surface 18.

Figure 2:
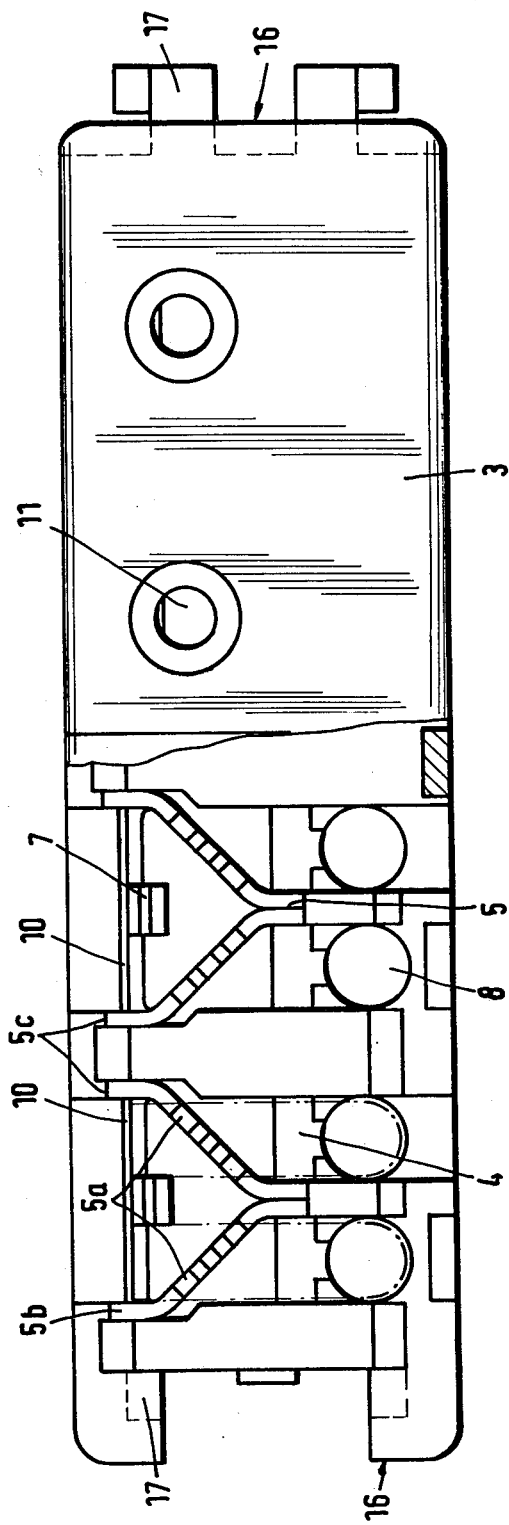
FIG. 2 is a partially broken plan view of the tubular guide means.

As will be apparent from FIG. 2, the end faces 16 of the wire connector are provided with connecting means 17 for connecting a plurality of wire connectors in series so as to form multipoint wire connectors. Furthermore, the figures show the design of the tubular guide means 8.

FIG. 3 shows such a serial arrangement of two wire connectors.

The wire connector body 3, i.e., the bottom portion 2 and the cover portion 1, are suitably made of plastics material.

FIG. 4 shows in particular the channel-like guide means 8a.

We claim:

1. A wire connector for connecting incoming and outgoing pairs of wires of a telecommunications cable, said connector comprising: a connector body (3) consisting of a cover portion (1) and a bottom portion (2), there being fixedly mounted in said bottom portion (2) at least one solderless, non-screwed, strip-free terminal element (5) for the termination of a pair of wires (4), said terminal element comprising contact arms (5a) and a resilient tab (7) integrally formed therewith, said tab having a crimped portion (6) at the distal end thereof adapted to engagingly receive a test prod, said contact arms (5a) of said terminal element (5) being positioned at an angle of 45 degrees relative to the axis of the connecting wires; said bottom portion (2) comprises tubular guide means (8) or channel-like guide means (8a) to receive and clamping ribs (9) at the inner ends of said guide means to retain in position the incoming and outgoing pair of cable wires; a cutting blade (10) for separating the cable ends is inserted in said bottom portion (2); said cover portion (1) furthermore comprises an aperture (11) adapted to receive a test prod (12) said aperture being positioned so that upon insertion, the test prod displaces and engages said resiliently oriented crimped portion of said tab for external connection to said terminal element.

2. A wire connector according to claim 1, characterized in that insertion lugs (13) are integrally formed with the cover portion (1), said lugs being adapted to force one of the wires between each pair of said contact arms for electrical interconnection of the two wires through the terminal element, and severing of the wire ends by means of said cutting blade when said cover portion is coupled with said bottom portion.

3. A wire connector according to claim 1, characterised in that said cover portion (1) and said bottom portion (2) are joined to one another by means of an arcuate film hinge (14) and in assembled position are latched to one another by means of detents (15).

4. A wire connector according to claim 1, characterized in that the contact ends (5b) of said contact arms (5a) are angular and are supported for stabilization in guide passages (5c) formed in said bottom portion.

5. A wire connector according to claim 1, characterized in that said connector is formed with end faces (16) said end faces being provided with connecting means (17) for serially connecting a plurality of said wire connectors to form a multipoint connector.

6. A wire connector according to claim 1, characterised in that both said cover portion (1) and said bottom portion (2) of the connector body (3) are made of plastics material.

* * * * *